United States Patent [19]
Ichinose et al.

[11] Patent Number: 5,307,496
[45] Date of Patent: Apr. 26, 1994

[54] MULTIPROCESSOR COMPUTING APPARATUS FOR UTILIZING RESOURCES

[75] Inventors: Akira Ichinose, Tokyo; Yoshinori Wakimoto, Ichikawa; Mitsuru Yanagisawa, Narashino, all of Japan

[73] Assignees: Kawasaki Steel Corporation, Kobe; Kawasaki Steel Systems R&D Corporation, Tokyo, both of Japan

[21] Appl. No.: 994,887

[22] Filed: Dec. 22, 1992

[30] Foreign Application Priority Data

Dec. 24, 1991 [JP] Japan .................. 3-356172

[51] Int. Cl.⁵ .......................... G06F 13/10
[52] U.S. Cl. ..................... 395/650; 364/DIG. 1; 364/228; 364/228.3; 364/229.1; 364/229.3; 364/281.6
[58] Field of Search ........... 364/DIG. 1 MS File; 395/650, 325, 200

[56] References Cited

U.S. PATENT DOCUMENTS

| | | | |
|---|---|---|---|
| 4,835,673 | 5/1989 | Rushby et al. | 364/DIG. 1 |
| 4,941,084 | 7/1990 | Terada et al. | 364/DIG. 1 |
| 5,109,486 | 4/1992 | Seymour | 364/DIG. 1 |
| 5,115,499 | 5/1992 | Stiffler et al. | 364/DIG. 1 |

FOREIGN PATENT DOCUMENTS 56-145442 11/1981 Japan.
63-178368 7/1988 Japan.

Primary Examiner—Thomas M. Heckler
Attorney, Agent, or Firm—Oliff & Berridge

[57] ABSTRACT

Resources possessed by a computer are registered in a resource table. A resource supply judging portion, in answer to a resource utilization request generated in its own computer or the computer in the preceding stage, judges whether or not it is possible to supply the resource from its own computer by reference to the resource table. When the resource is judged suppliable in the judgment, a resource supplier brings the corresponding resource into a utilizable state. A utilization request transmitter, when the resource was judged unsuppliable, transmits the resource utilization request to the computer in the following stage and, at the same time, sets up a resource supply path. With the described arrangement, utilization of a resource of another computer is made possible without having resources managed by a plurality of computers in a centralized manner. Further, dependence of an executed application program on the resource status is lowered and adaptability thereof to a change in the resource status is improved.

9 Claims, 10 Drawing Sheets

MULTIPROCESSOR COMPUTING APPARATUS FOR UTILIZING RESOURCES

BACKGROUND OF THE INVENTION

1. Field of the Invention

The present invention relates to a computer having a processor for executing an application program that utilized various resources and a communicator for communicating with another computer. The invention also relates to a multiprocessor computing apparatus having a plurality of processors for executing application programs and resources utilized by the application programs. More particularly, it relates to a computer or a multiprocessor computing apparatus having a lower dependence of the executed application program on the resource status and an improved adaptability of the same on a change in the resource status.

2. Description of the Prior Art

In a computer having a processor executing an application that uses various resources; and a communicator for communicating with another computer, it is known to use an application program of the first computer executed by a second computer through the communicator.

The above is practiced, for example, when a computer executing an application program is lacking or is short of the computer resource required for the execution of the application program.

For example, the execution of the first computer's application program by another computer is achieved by transmitting whole or part of the application program to another computer. Otherwise, when an application program is executed in a first computer, the application program is executed utilizing a resource of another computer through a predetermined communicator, according to a program included in the application program, in which the address of the other computer possessing the utilized resource is prescribed.

For example, a system is disclosed in Japanese Laid-open Patent Publication No. 63-178368 in which a task operating in a first computer accesses a resource in a second computer connected with the first computer through a communication line. In this system, the first computer is provided with a system table showing one or more second computers accessible by the first computer, a resource table showing resources, which are pointed from each item of the system table, possessed by the second computers and accessible by the first computer, and a chain comprising control blocks, which are pointed from the respective items of the resource table, each control block being provided for each task of the first computer accessing the resource shown in the item of the resource table.

According to the above Japanese Laid-open Patent Publication No. 63-178368, a computer in a system formed of a plurality of interconnected computers can access a resource in another computer.

In Japanese Laid-open Patent Publication No. 56-145442 an art is disclosed for achieving centralized management of resources by a plurality of computers by providing a resource management mechanism in a multi computer system. This art is such that, when a command for a resource securing request is issued from a computer to the resource management mechanism, the resource management mechanism transmits an interrupt signal indicating whether success or failure of the resource securing was to that computer. When the computer issues a command for a resource releasing request to the resource management mechanism, the resource management mechanism sends a notice of release to all computers or to that computer waiting for the release of resource by an interrupt signal.

According to the above Japanese Laid-open Patent Publication No. 56-145442, notice the release of the resource can be immediately transmitted to the computer waiting for the release of the resource after the resource has been released.

Hereinafter, an arrangement having a processor executing an application program, resources used by the application program, and a communicator for communicating with another computer will simply be called "computer".

The above resources (computer resources) include for example: (1) input devices such as key boards; (2) output devices such as line printers; (3) memory units such as hard disk; (4) data and files in the memory units; (5) processors (processing time, etc.) such as CPUs (central processing units); and (6) software executed by the processors.

The status of resources such as presence or absence of a resource and availability or nonavailability of the resource will hereinafter be called "resource status".

The above described application program means a program utilizing the resources. More specifically, it means a program controlling such resources and the like other than the operating system.

In arts allowing an application program to utilize a resource of another computer, such as that described above in which whole or part of the application program is transmitted to another computer having the required resource to execute the program at the other computer, and where a program for utilizing a resource of another computer included in the application program is used, a problem exists requiring the first computer to know in advance which computer the required resource is existing in. For example, an application program using resources has to be prepared by knowing which computer will execute the program, or in which computer the required resource is existing.

In the above described Japanese Laid-open Patent Publication No. 63-178368, each computer has to retain data of resources of all other computers. Accordingly, when a change is made in the resource status, all data about resources in other computer has to be revised. Thus, there has been difficulty in the data maintenance.

In the above described Japanese Laid-open Patent Publication No. 56-145442, there have been various problems because resources are managed by a plurality of computers in a centralized manner. That is, the art disclosed in the Japanese Laid-Open Patent Publication No. 56-145442 is difficult to apply to a multiprocessor computing apparatus of a distributed processing type. For example, when distributed processing is made in a plurality of computers connected through a LAN (local area network), there has a problem that the response speed is lowered because communication between the resource management mechanism for managing resources in a centralized manner and each computer have had to be made through the LAN.

SUMMARY OF THE INVENTION

The present invention has been made to solve the above problems in the convention arts. Accordingly, it is an object of the present invention to provide a computer or a multiprocessor computing apparatus in which resources are not managed by a plurality of computers in a centralized manner, dependence of an executed application program on the resource status is lowered, and its adaptability to a change in the resource status is improved.

According to an aspect of the present invention, there is provided a computer having a processor for executing an application program, various resources utilized by the application program, and a communicator for communicating with another computer. The above mentioned object is achieved by comprising an apparatus a resource table in which resources possessed by a first computer are registered, a resource supply judging portion for judging, in answer to a resource utilization request generated in the first computer or a computer connected through the communicator, whether or not it is possible to supply the requested resource from the respective computer referring to the resource table. The apparatus also comprises by a resource supplier for bringing, when the requested resource is judged suppliable in the above judgment, the corresponding resource into a utilizable state. The apparatus further comprises a utilization request transmitter for transmitting the above resource utilization request to a subsequent computer using the communicator when the resource is judged unsuppliable in the above judgement and, at the same time, setting up a resource supply path.

The above described aspect of the present invention will hereinafter be called "first invention".

According to another aspect of the present invention, there is provided a multiprocessor computing apparatus, in a multiprocessor computing apparatus having a plurality of processors executing application programs and resources utilized by the application programs. The above mentioned object is achieved by having each of the processors, two or more in number, provided with the structure of the computer according to the first invention, the computers arranged in a daisy chain connection with respect to the output of the utilization request transmitter and the input of the resource supply judging portion, and the utilization request transmitter provided with the function to generate a resource supply error when a computer has no computer connected in the following stage of the daisy chain connection. When the requested resource is judged unsuppliable in the resource supply judging portion, a resource error is transmitted to the requester originated the resource utilization request using the resource supply paths set up in the computers in preceding stages in succession.

The above described aspect of the present invention will hereinafter be called "second invention".

By sharing common resources among a plurality of computers, meritorious effects as mentioned below can be obtained.

A1. The total number of utilized resources can be decreased and, hence, cost, occupation area, and so on can be reduced.

A2. When a resource goes out of order, a resource similar to it can be used and, hence, reliability on the system as a whole can be improved.

A3. Files and data can be unified.

The present invention, in order to effectively achieve the sharing in common resources having such merits as described above, aims at the following points, which will hereinafter be called "points aimed at" B1 to B6:

B1. To lower dependence of an application program on the resource status.

B2. To improve adaptability of an application program to a change in the resource status.

B3. To eliminate duplicate management of resources by a plurality of computers.

B4. To facilitate maintenance of data for resource management.

B5. To shorten the resource allocation time prior to the resource utilization.

B6. To save the delay time during the resource utilization.

FIG. 1 is a block diagram showing the main points of the first invention herein.

The computer of the first invention, as shown in FIG. 1, has a resource table 20 in which resources possessed by the first computer are registered and a resource management controller 10.

The resource management controller 10 comprises a resource supply judging portion 12, a resource supplier 14, and a utilization request transmitter 16.

The computer of the first invention is utilized in an arrangement having two or more of the same. The computers are connected to constitute a daisy chain with respect to their output of the utilization request transmitter 16 and their input of the resource supply judging portion 12.

The second invention herein is a variation of the computer according to the first invention herein.

The daisy chain is such that is employed, for example, in interruption control in an MPU (micro processor unit) chip and control of occupation of a bus. The daisy chain in the invention herein is such that the input of the resource supply judging portion of each computer is connected with the output of the utilization request transmitter of the computer in the preceding stage. The output of the utilization request transmitter of each computer is connected to the input of the resource supply judging portion of the computer in the following stage.

The computer in the preceding stage of the first invention means the other computer connected to the input side of the resource supply judging portion 12 through a predetermined communicator, and the computer in the following stage means the other computer connected with the output side of the utilization request transmitter 16 through a predetermined communicator.

In the present invention, the communicator for achieving a connection with another computer is not limited to a particular type. For example, it may be a tight connection through an internal bus or it may be a loose connection through a LAN such as Ethernet. Otherwise, it may be such that effects a connection with a remote computer through a DDX (Digital Data Exchange) network.

The resource supply judging portion 12, upon receipt of a resource utilization request generated in its own computer or the computer in the preceding stage, judges whether or not the respective computer can supply the resonance.

The resource supplier 14 brings the corresponding (requested) resource into a utilizable state when the resource supply judgment portion 12 judges that the resource is suppliable. The utilizable state is such a state where there is a secured path through which the application program utilizing the resource can utilize the resource.

The utilization request transmitter 16 is that the resource is undeliverable, transmits the resource utilization request to the computer in the following stage when the resource supply judging portion 12 judges that the resource is undeliverable. The utilization request transmitter 16 sets up a resource supply path through which the application program utilizes a resource in the computer in the following stage (or a computer in a more downstream stage) following the transmission of the resource utilization request to the computer in the following stage.

According to the arrangement of the first invention herein, a resource of another computer can be utilized without having resources managed by a plurality of computers in a centralized manner, dependence of an executed application program on the resource status is lowered, and adaptability of it to a change in the resource status can be improved (the points aimed at B1 to B3).

Since the resource table 20 has the data of only the resources possessed by each respective computer, the resource table 20 can be adapted to the change virtually immediately only by changing the corresponding data in the resource table 20 of its own (the point aimed at B4) when a change is made in presence, absence, or availability of the resources in the respective computer. Since the data of the resource table 20 is only that relating to the resources in its own computer, the processing time for resource allocation performed in the resource supply judging portion 12 or the like can be made shorter than that, for example, in Japanese Laid-open Patent Publication No. 63-178368 (the point aimed at B5). Since the resource supply path can be set up immediately after it has been judged which resource of which computer is the resource utilized by an application program, the delay time during the resource utilization can be saved (the point aimed at B6).

BRIEF DESCRIPTION OF THE DRAWINGS

The preferred embodiments will be described with reference to the drawings, wherein identical elements have been denoted throughout the figures with identical reference numerals, and wherein.

DETAILED DESCRIPTION OF THE PREFERRED EMBODIMENTS

An embodiment of the present invention will be described below in detail with reference to the accompanying drawings.

Figure 2:
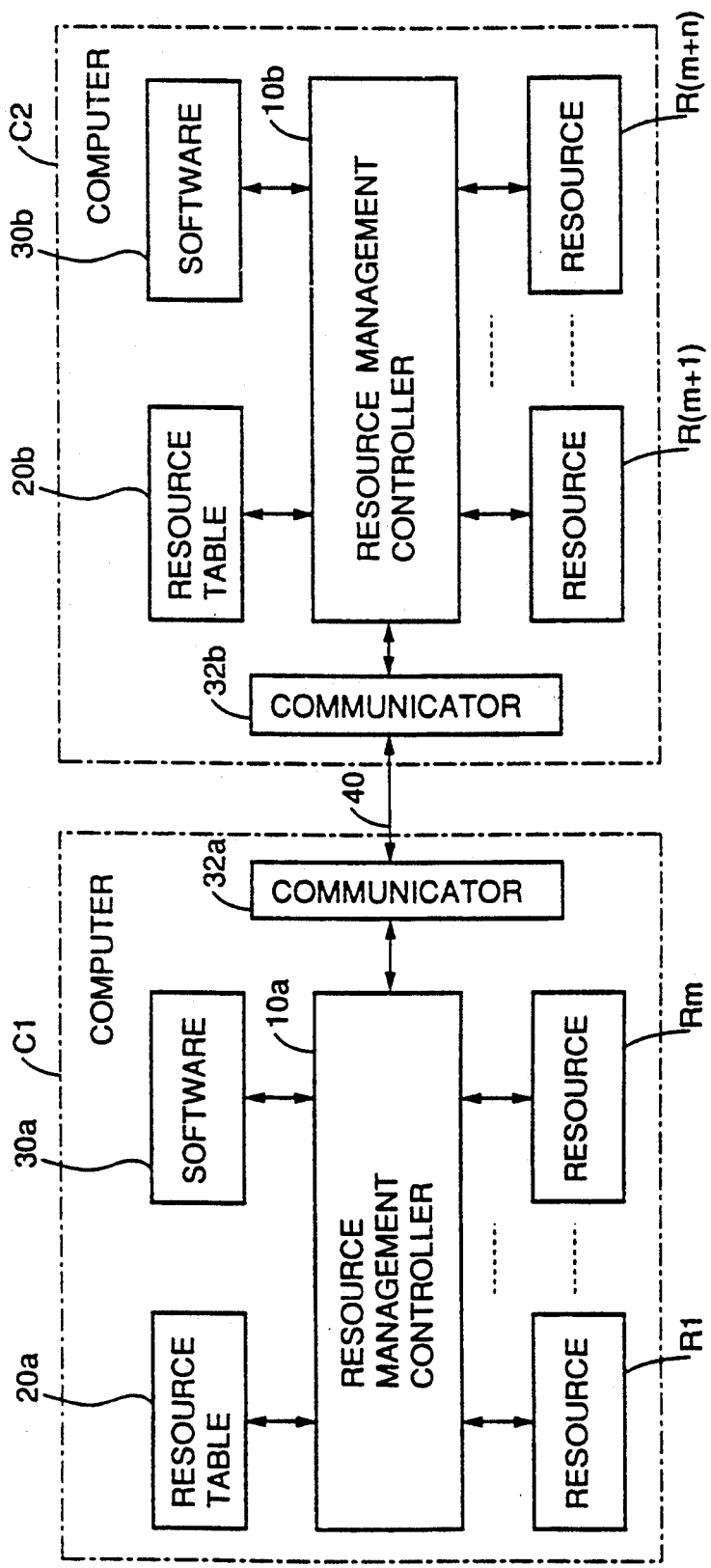
FIG. 2 is a block diagram of a first embodiment of the present invention.

FIG. 2 is a block diagram showing a first embodiment of the present invention.

The first invention herein is being applied to the computers C1 and C2 in FIG. 2.

As shown in FIG. 2, the computers C1 and C2 each have a resource management controller 10a, 10b, a resource table 20a, 20b, and a communicator 32a, 32b. The computer C1 has software 30a as a group of application programs and m resources in all R1 to Rm, while the computer C2 has software 30b as a group of application programs and n resources in all R(m+1) to R(m+n).

The resource management controller 10a, 10b, which corresponds to that denoted by the corresponding reference numeral in FIG. 1, will be described later in detail with reference to FIG. 3.

Figure 1:
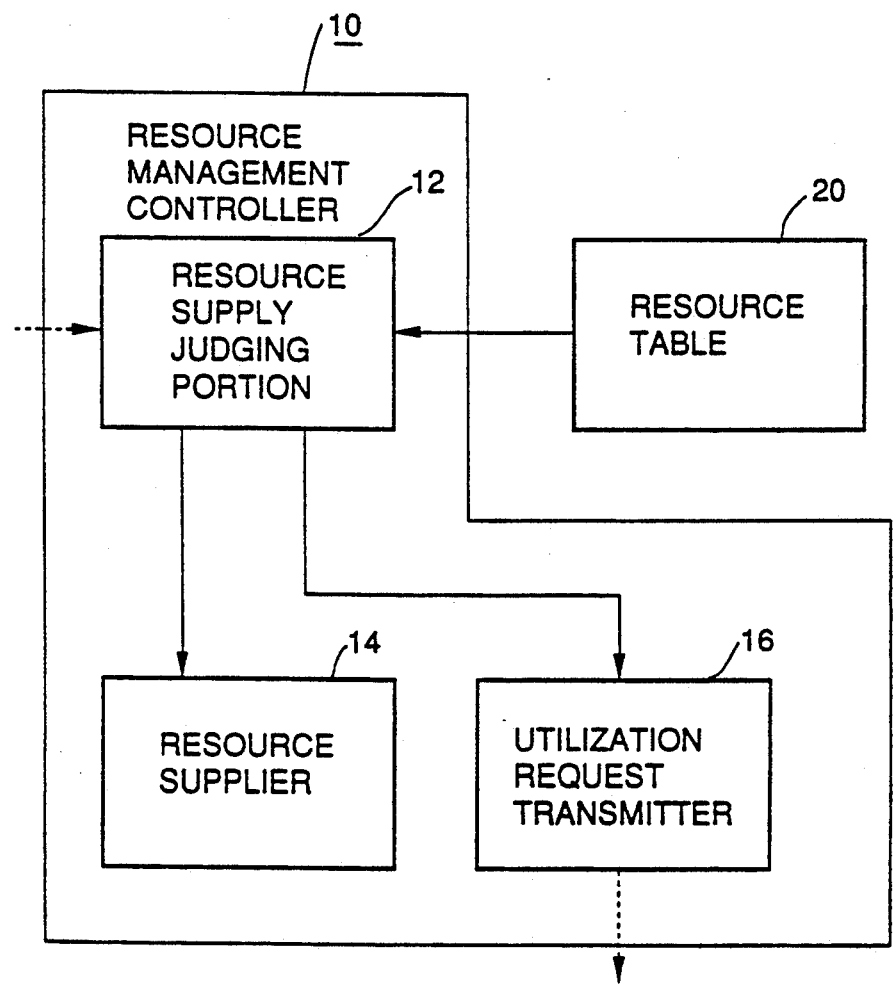
FIG. 1 is a block diagram showing the first invention herein.

The resource table 20a, 20b is identical with that denoted by the corresponding reference numeral in FIG. 1.

The communicator 32a, 32b is a both way communication means for one of the resource management controllers 10 to communicate with the other computer C1 to C2.

Some of the resources R1 to R(m+n) may be equivalent and others may not be equivalent to each other.

The resources R1 to R(m+n) include, for example, input devices such as key boards, output devices such as line printers, memory units such as hard disks, processors such as CPUs, files, data, and so on stored in the memory units, or software of various kinds, etc.

Figure 3:
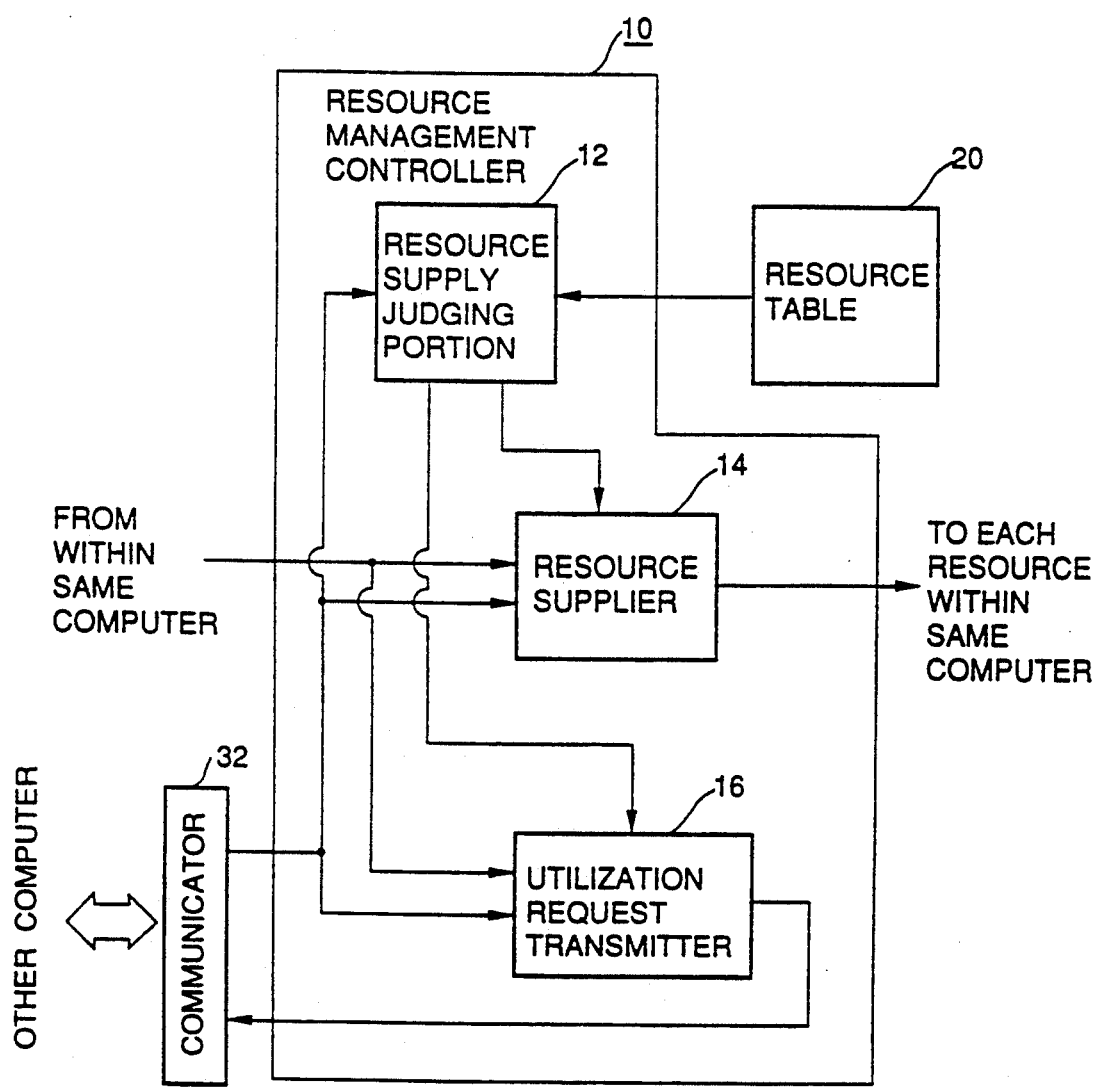
FIG. 3 is a block diagram of a resource management controller in the first embodiment.

FIG. 3 is a block diagram showing the resource management controller of the first embodiment.

The resource management controller 10 provided in the computers C1 and C2 of the first embodiment includes, as shown in FIG. 3, a resource supply judging portion 12, a resource supplier 14, and a utilization request transmitter 16.

The resource supply judging portion 12 receives a resource utilization request generated in its own computer or a resource utilization request generated in the other computer C1 or C2 through the communicator 32. The resource supply judging portion 12, upon receipt of such a resource utilization request, judges by reference to the resource table 20 whether or not it is possible to supply the resource that is requested in the resource utilization request from its own computer. The result of the judgment is output to the resource supplier 14 and the utilization request transmitter 16.

When the resource supply judging portion 12 judges that the resource can be supplied, the resource supplier 14 brings the resource corresponding to the resource utilization request into a state utilizable by the application program generated the resource utilization request. More specifically, the application program and the resource are brought into connection. The connection may be effected within the resource supplier 14 or caused by the resource supplier 14 to be effected in some position outside itself.

When it is the resource supply judging portion 12 judges that the resource cannot be supplied, the utilization request transmitter 16 executes the following processes:

(1) Transmits the resource utilization request to the other computer C1 or C2.

(2) Sets up a resource supply path through which the application program generated the resource utilization request can utilize the resource of the other computer.

The resource supply path is utilized as follows:

(1) When it is possible to utilize a resource of the other computer, the application program of its own computer utilizes the resource of the other computer through the resource supply path.

(2) When it is impossible to utilize a resource of the other computer, a resource supply error is transmitted to the application program of its own computer. The resource supply error is output from the resource management controller 10 of the other computer and input through the communicator 32. An example will be described below with reference to FIG. 2 and FIG. 3 where the software 30a within the computer C1 uses a resource A within its own computer C1.

When the software 30a utilizes the resource A, this is transmitted as a predetermined command to the resource management controller 10 of its own computer C1. The resource management controller 10 judges, by reference to the resource table 20 in its own computer, that a resource R1 within its own computer C1 can be utilized as the resource A (the resource supply judging portion 12.) The resource management controller 10 brings the resource R1 into a utilizable state (the resource supplier 14).

Now, an example where the software 30a within the computer C1 uses a resource B within the other computer C2 will be described below with reference to FIG. 2 and FIG. 3.

When it becomes necessary for the software 30a to utilize the resource B, the software 30a first transmits a predetermined command for it to the resource management controller 10 within its own computer C1. The resource management controller 10 cannot find a resource corresponding to the resource B though it searches the resource table 20 within its own computer C1 for it (the resource supply judging portion 12).

In this case, the command is transmitted, through the resource management controller 10 (the utilization request transmitter 16), and the communicator 32 of its own computer C1 and the communicator 32 of the other computer C2, to the resource management controller 10 of the other computer C2. This resource management controller 10 finds the resource R(m+1) corresponding to the resource B by reference to the resource table 20 of its own computer C2 (the resource supply judging portion 12).

Then, the software 30a of the computer C1 utilizes the resource R(m+1) of the computer C2 through the resource management controller 10 (the utilization request transmitter 16) of its own computer C1 and the resource management controller 10 (the resource supplier 14) of the other computer C2.

An example where the software 30a of the computer C1 utilizes a resource C which is not present in either of the computer C1 and the computer C2 will be described below with reference to FIG. 2 and FIG. 3.

When the software 30a utilizes the resource C which is present in neither the computer C1 nor the computer C2, first a predetermined command is transmitted to the resource management controller 10 of its own computer C1. The resource management controller 10 cannot find the resource corresponding to the resource C in the resource table 20 of its own computer C1.

The resource management controller 10 transmits the command for the resource C issued by the software 30a to the resource management controller 10 of the other computer C2 through the communicators 32 of its own computer C1 and the other computer C2. This resource management controller 10 cannot find the resource corresponding to the resource C in the resource table 20 of its own computer C2.

In this case, the resource management controller 10 generates a resource supply error (the utilization request transmitter 16). The resource supply error is transmitted to the software 30a through the resource management controller 10, the communicator 32 of the computer C2, the communicator 32 of the computer C1 and the resource management controller 10 of the computer C1.

As described above, in the first embodiment, the two computers can utilize resources of each other. Further, since the utilized resource is automatically decided in such elements as resource management controller, dependence on the resource status of the software is lowered.

Figure 4:
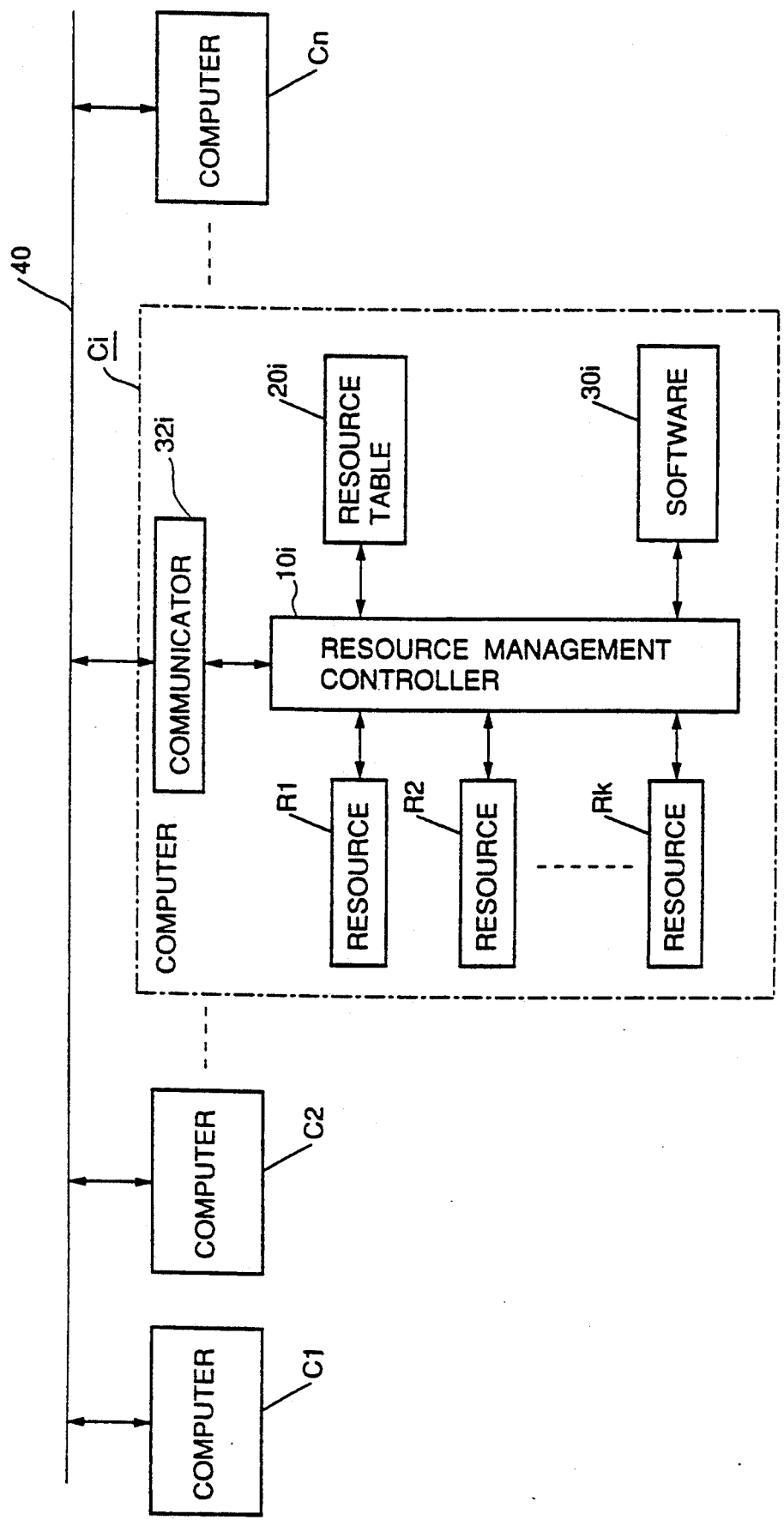
FIG. 4 is a block diagram of a second embodiment of the present invention.

FIG. 4 is a block diagram showing a second embodiment of the present invention.

The second embodiment has the first invention and the second invention herein applied thereto.

As shown in FIG. 4, there are n computers Cl to Cn connected to a bus type communication means 40.

Each of the computers C1 to Cn in the second embodiment has virtually the same structure as that of the computers C1 and C2 of the first embodiment.

For example, the computer C1 of the second embodiment has a resource management controller 10i, a resource table 20i, and a communicator 32i. Further, the computer Ci has software 30i as a group of application programs and k resources in all R1 to Rk. Some of the resources R1 to Rk may be equivalent and others may not be equivalent.

Figure 5:
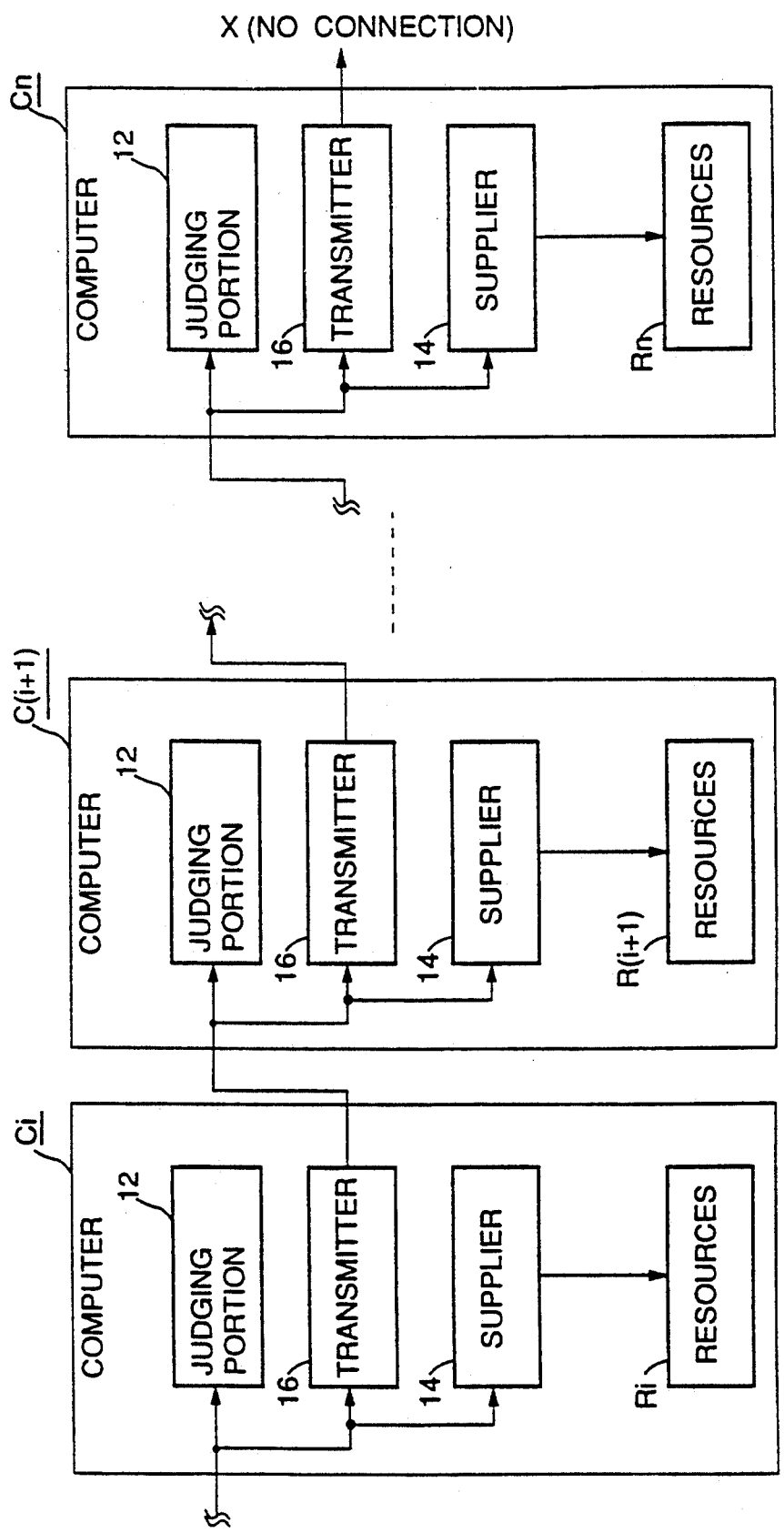
FIG. 5 is a virtual connection diagram of computers while executing resource management in the second embodiment.

FIG. 5 is a virtual connection diagram of the computers in the second embodiment while the resource management is being executed.

As shown in FIG. 4, the computers C1 to Cn of the second embodiment are connected to a bus type communication means 40. However, when the resource management is executed, all or part of the computers C1 to Cn are brought into a daisy chain connection as shown in FIG. 5. More specifically, those computers are brought into a daisy chain connection connecting the output of the utilization request transmitter 16 with the input of the resource supply judging portion 12 of the interconnected computers.

The manner of connection depends on which of the other computers the utilization request transmitter 16 transmits the request to, when, for example, transmitting a resource utilization request. The destinations of the resource utilization request are set up by the utilization request transmitter 16 of each computer Ci. In such a daisy chain connection, the sequence of connection of the computers is not fixed, nor is it decided in terms of hardware.

Figure 6:
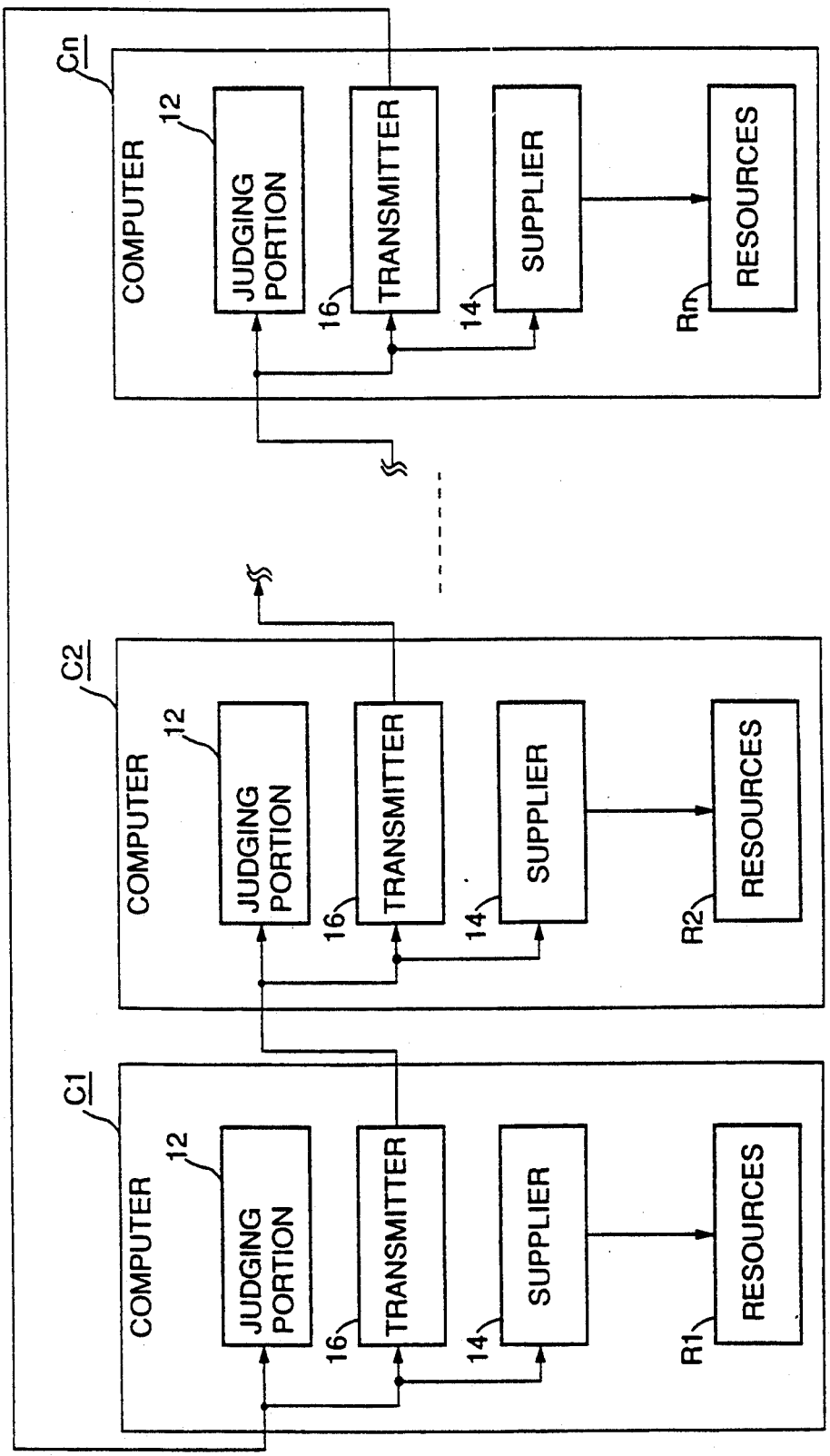
FIG. 6 is a virtual connection diagram of computers in a third embodiment as a modification of the second embodiment.
Figure 7:
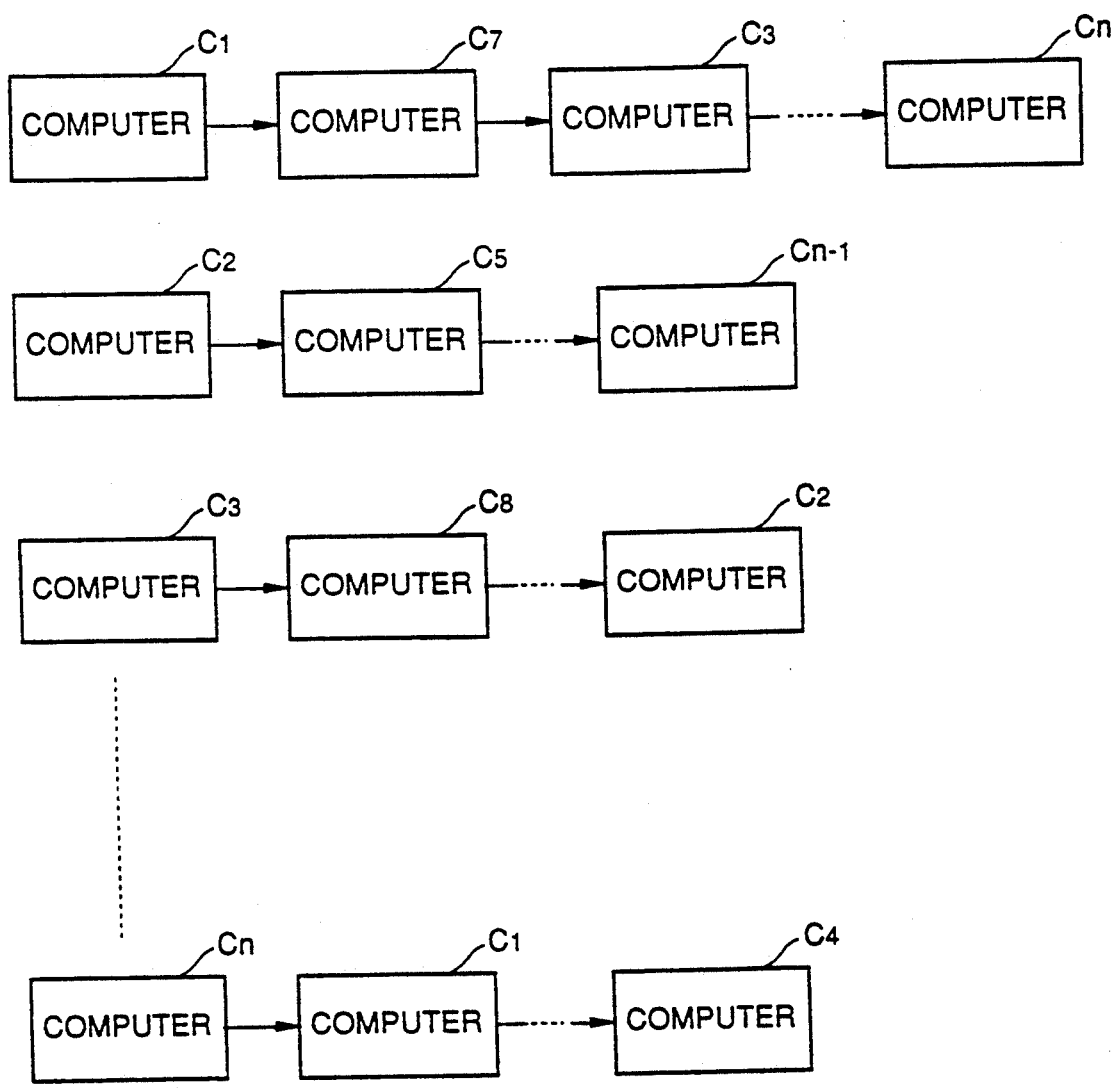
FIG. 7 is a virtual connection diagram of computers in a fourth embodiment as a modification of the second embodiment.

Referring to FIG. 5, the output of the utilization request transmitter 16 of the last computer Cn may be changed from the illustrated unconnected state to a state connected to the input of the resource supply judging portion 12 of the computer C1 in the foremost stage as in a third embodiment shown in FIG. 6. Then, the n computers in all C1 to Cn are connected in a loop form with respect to the outputs of their utilization request transmitters 16 and the inputs of their resource supply judging portion 12.

If arranged as in the third embodiment, any one of the computers Cl to Cn may generate a resource utilization request. The judgment as to whether or not the resource corresponding to the resource utilization request is present can be exercised successively in all computers Cl to Cn.

When the computers Cl to Cn are connected in a loop form as in the third embodiment, if a resource utilization request generated in its own computer has been circulated through the loop and input to the resource supply judging portion 12 of its own computer again, it means that the resource corresponding to the resource utilization request is not obtainable from any of the computers Cl to Cn. Therefore, this case is treated as a resource supply error.

The daisy chain connection of the computers Cl to Cn of the second embodiment shown in FIG. 5 can be arranged, as shown in a fourth embodiment shown in FIG. 4, such that the daisy chain connections are different with each of the computers Cl to Cn originating a resource utilization request, according to, for example, the kinds of resources possessed by each computer. In this case, since systematic daisy chain connections are provided, a necessary resource can be found sooner and the communication quantity of the bus in the execution of the resource management can be decreased. Further, any of the computers Cl to Cn may originate a resource utilization request. The judgment as to whether or not the resource corresponding to the resource utilization request can be exercised successively in all computers Cl to Cn when the systematic daisy chain is set so as to include all computers. Therefore, it is not necessary to have the computers C1 to Cn connected in the loop form as described above.

Figure 8:
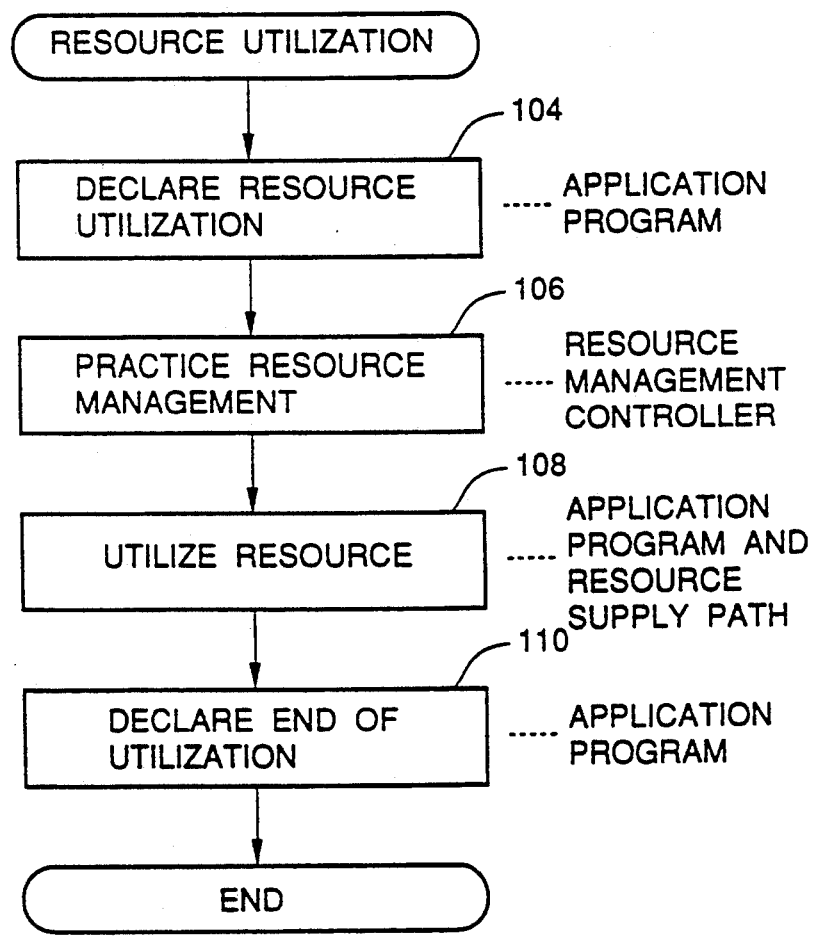
FIG. 8 is a flow chart of resource utilizing procedure in the second embodiment.

FIG. 8 is a flow chart for a resource utilization procedure in the second embodiment.

In the flow chart of FIG. 8, the steps followed when the software 30$i$ in each individual computer utilizes the resource are shown.

First, when it is decided that the software 30$i$ utilizes a resource in step 104 of FIG. 8, a predetermined command is transmitted to the resource management controller 10$i$ of its own computer Ci.

In the following step 106, the resource management controller 10$i$ executes a process. The process in the step 106 will be described in detail using FIG. 9.

In the following step 108, the application program 30$i$ utilizes the resource it requires through the resource supply path set up in the preceding step 106.

When the application program 30$i$ has finished the utilization of the resource, the application program 30$i$ transmits a predetermined command indicating the end of utilization to the resource management controller 10$i$ in the step 110. The resource management controller 10$i$ releases both the set up resource supply path and the used resource.

Figure 9:
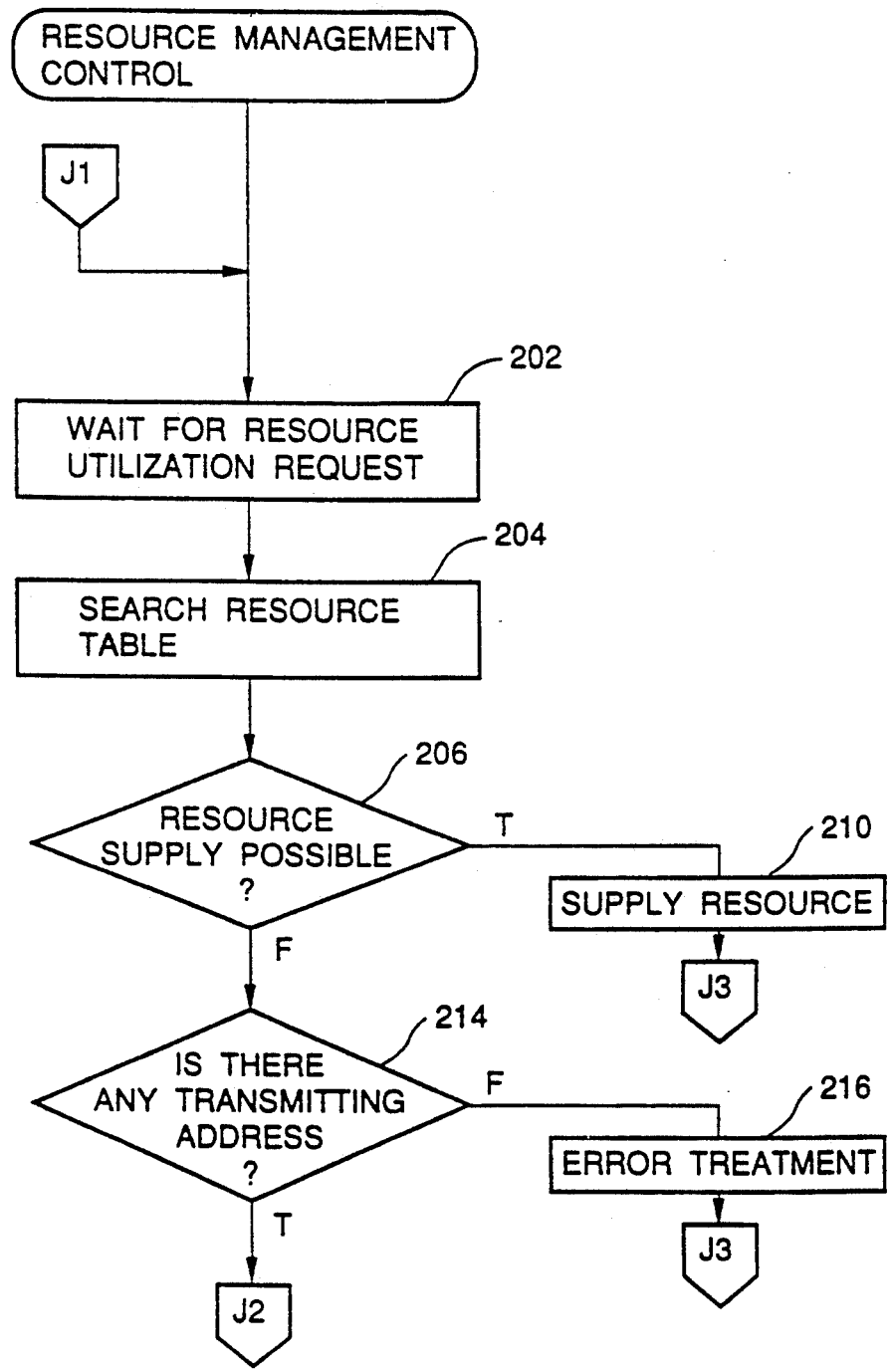
FIG. 9 is a first flow chart of resource management controlling procedure in the second embodiment.

FIG. 9 is a first flow chart of a resource management procedure in the second embodiment.

Figure 10:
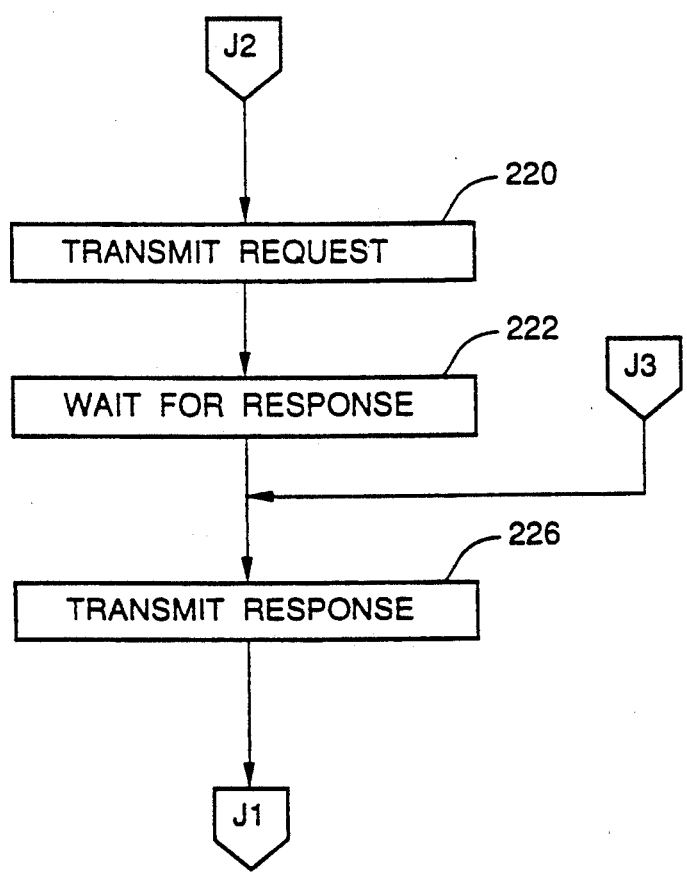
FIG. 10 is a second flow chart of the same resource management controlling procedure.

FIG. 10 is a second flow chart of the resource management procedure.

In FIG. 9 and FIG. 10, the resource management controlling process shown in the step 106 of FIG. 8, namely, the operations performed chiefly in the resource management controller 10$i$, is shown.

The procedures shown in FIG. 9 and FIG. 10 are executed upon generation of a resource utilization request in its own computer or the computer in the preceding stage.

The first step 202 of FIG. 9 is a state waiting for a resource utilization request from its own sofware 30$i$ or the software of another computer (the computer in the preceding state). When a resource utilization request is generated, the flow advances to the following step 204. In the step 204, the resource table 20$i$ of the resources possessed by its own computer Ci is searched for the resource requested in the resource utilization request.

In the following step 206, it is judged whether or not its own computer Ci is capable of supplying the resource corresponding to the generated resource utilization request on the basis of the result of the search of the resource table made in the step 204. When the resource is judged suppliable in the judgment, the flow moves to step 210. When the resource is judged unsuppliable in the judgment, the flow advances to the following step 214.

In the step 210, the resource supply path for supplying the requested computer resource to the requester is set up (the resource is brought into a utilizable state) in its own computer (the resource supplier 14, etc.) After the step 210 has been executed, the flow moves to the front of step 226 in FIG. 10.

In the step 214, it is judged whether or not another computer (the computer in the following stage) as the destination address of the resource utilization request is registered in the utilization request transmitter 16. This is performed for transmitting the resource utilization request to the other computer because the judgment in the step 206 was that the resource is unsuppliable.

In the step 214, if the judgment therein is that there is a destination address, the flow moves to step 220 of FIG. 10. The case where it is judged as above that there is a destination address in the judgment is a case where there is a computer in the following stage as with the computer Ci or the computer C(i+1) shown in FIG. 5. On the other hand, if the judgment inthe step 214 is that there is no destination address, the flow moves to step 216. The case when it is judged that there is no destination address in the judgment is case when there is no computer in the following stage as with the computer Cn shown in FIG. 5. There is no other computer connected with the output of the utilization request transmitter 16 of the computer Cn.

In the step 216, a predetermined error treatment is given because supply of the available resource corresponding to the resource utilization request is impossible as the results of the judgment in the step 206 and the step 214, or, more specifically, because the resource corresponding to the resource utilization request is not present in its own computer and any other computer to which the resource utilization request is to be transmitted is not registered.

The error handling is, for example, such that transmits a resource supply error, indicative of the fact that there is no available resource corresponding to the generated resource utilization request, to the computer that generated the resource utilization request. The transmission of the resource supply error to the computer that generated the resource utilization request is effected, for example, through computers in the preceding stages (the utilization request transmitter 16, etc.) in succession.

In the step 220 of FIG. 10, the resource utilization request received by its own computer is transmitted to the computer that is registered in the utilization request transmitter 16 of its own computer in its own computer.

In the following step 222, a response is waited far from the transmission made in the step 220 coming from the computer to which the request was transmitted (in the next stage). When the response is received, the flow advances to the following step 226.

The step 226 is executed following the execution of the step 210, the step 216, or the step 222. In the step 226, the answer to the resource utilization request is transmitted to the computer that generated the resource utilization request (the requester). The transmission is practiced using the computers in the preceding stages in succession. All of the operations of other computers in answer to the currently generated resource utilization request have been completed by finishing the execution of the step 226. Hence, the flow returns to the front of the step 202 in FIG. 9.

According to the second through fourth embodiments, as described above, it is possible to utilize a resource of another computer by using n computers in all C1 to Cn with the first invention applied thereto. In so doing, centralized management of resources by a plurality of computers can be eliminated and dependence on the resource status of an executed application program can be lowered, and response to a change in the resource status of the same can be improved.

According to the present invention, as described above, excellent effects can be obtained such that resources of other computers can be utilized without having duplicated management of resources executed by a plurality of computers and, further, that dependence of an executed application program on the resource status is lowered and adaptability of the same to a change in the resource status is improved.

What is claimed is:

1. A multiprocessor computing apparatus comprising a plurality of computers, each computer comprising:
   a processor capable of executing an application program, the application program using at least one resource, the application program generating requests for resources;
   communication means for communicating with other ones of the plurality of computers, wherein the processors of the plurality of computers operate the respective communication means to place the plurality of computers into a daisy chain configuration, the daisy chain configuration comprising linking the communication means of each computer with at least one of the communication means of a preceding computer and the communication means of a succeeding computer, wherein the resource request passes from a request originating computer to subsequent computers serially in a first direction;
   a resource table listing resources available in the computer;
   first memory means for storing said resource table;
   resource supply judging means for determining, in response to a resource request, whether the computer is capable of supplying the requested resource based on the available resources listed in the resource table, the request received from one of the preceding computer and the application program;
   resource supply means for allocating the requested resource when the resource supply judging means determines that the computer is capable of supplying the requested resource; and
   resource request transmission means for transmitting said resource request to the succeeding computer in the daisy chain configuration when the resource supply judging means determines that the computer is unable to supply the requested resource.

2. The multi-processor computing apparatus of claim 1, wherein each computer further comprises a resource management control means for outputting a resource supply error signal through said communication means, the resource supply error signal being input to the application program generating the resource request, the resource supply error signal transmitted through said daisy chain configuration in a direction opposite to the first direction.

3. The multiprocessor computing apparatus of claim 2, wherein the resource management control means outputs the resource supply error when the respective computer is not connected to a succeeding computer and the resource supply judging means determines the respective computer is not capable of supplying the requested resource.

4. The multiprocessor computing apparatus of claim 1, wherein said resource request transmission means of each computer is connected to said resource supply judging means of the succeeding computer through the communication means of each respective computer; and
   said resource request transmission means generates a resource supply error when said resource supply judging means of a last-stage computer in the daisy chain configuration determines that the last-stage computer is incapable of supplying the requested resource, said resource request transmission means transmitting said resource supply error to the request originating computer through said communication means of each respective computer, the resource supply error transmitted through the daisy chain configuration.

5. The multiprocessor computing apparatus of claim 4, wherein each of said plurality of computers is coupled to the corresponding communication means in a bus connection.

6. The multiprocessor computing apparatus of claim 4, wherein said plurality of computers are connected in the form of a loop, the resource request transmission means of the last-stage computer connected to the resource supply judging means of a first-stage computer, wherein the resource supply error is generated when the resource request generated by the request generating computer is input to the request generating computer after circulating through the loop.

7. The multiprocessor computing apparatus of claim 1, wherein said resources include at least one of an input device, an output device, a memory, the processor, a file, data and software stored in a second memory.

8. The multiprocessor computing apparatus of claim 1, wherein a secured supply path connects the requested resource and the application program generating the resource request when the resource supply judging means of the respective computer determines that the respective computer is capable of supplying the requested resource.

9. The multiprocessor computing apparatus of claim 1, wherein said resource supply means supplies the requested resource to one of the application program and the communication means.

* * * * *